United States Patent
Bode

(10) Patent No.: US 6,713,554 B2
(45) Date of Patent: Mar. 30, 2004

(54) COMPOSITIONS FOR THE MANUFACTURE OF ORGANO-MINERAL PRODUCTS, PRODUCTS OBTAINED THEREFROM AND THEIR USE

(75) Inventor: Harald Bode, Dortmund (DE)

(73) Assignee: Fosroc International Limited (GB)

( * ) Notice: Subject to any disclaimer, the term of this patent is extended or adjusted under 35 U.S.C. 154(b) by 17 days.

(21) Appl. No.: 10/182,903
(22) PCT Filed: Feb. 8, 2001
(86) PCT No.: PCT/GB01/00491
§ 371 (c)(1), (2), (4) Date: Aug. 30, 2002
(87) PCT Pub. No.: WO99/01492
PCT Pub. Date: Jan. 14, 1999

(65) Prior Publication Data
US 2003/0139525 A1 Jul. 24, 2003

(30) Foreign Application Priority Data
Feb. 8, 2000 (DE) .......................... 100 05 525

(51) Int. Cl.⁷ .............. C08J 3/00; C08K 3/20; C08L 75/00
(52) U.S. Cl. ........... 524/588; 427/372.2; 427/385.5; 524/589; 524/590; 524/591; 524/837; 524/838; 524/839; 524/840; 524/44; 524/21; 524/49; 524/52; 524/85

(58) Field of Search .................. 524/588, 589, 524/590, 591, 837, 838, 839, 840; 528/44, 21, 49, 52, 85; 427/385.5, 372.2

(56) References Cited

U.S. PATENT DOCUMENTS
3,607,794 A * 9/1971 Abbotson et al.

FOREIGN PATENT DOCUMENTS
DE 197 28 252 A 1/1999

OTHER PUBLICATIONS
Patent Abstracts of Japan, vol. 1997, No. 9, Sep. 30, 1997, & JP 09 132634 A (Nippon Polyurethane Ind. Co. Ltd.), May 20, 1997, abstract.

* cited by examiner

Primary Examiner—Patrick Niland
(74) Attorney, Agent, or Firm—Nixon & Vanderhye P.C.

(57) ABSTRACT

The present invention relates to a composition comprising a component (A) containing, an aqueous alkali silicate solution and a primary amino-alcohol as a catalyst, and a component (B) containing a polyisocyanate. The present invention further relates to organo-mineral products which can be obtained by the transformation of polyisocyanates and aqueous alkali silicate solutions in the presence of a primary amino-alcohol as a catalyst. The organo-mineral products can be used as building, coating, sealing or insulating materials, or as a cement or adhesive.

14 Claims, 2 Drawing Sheets

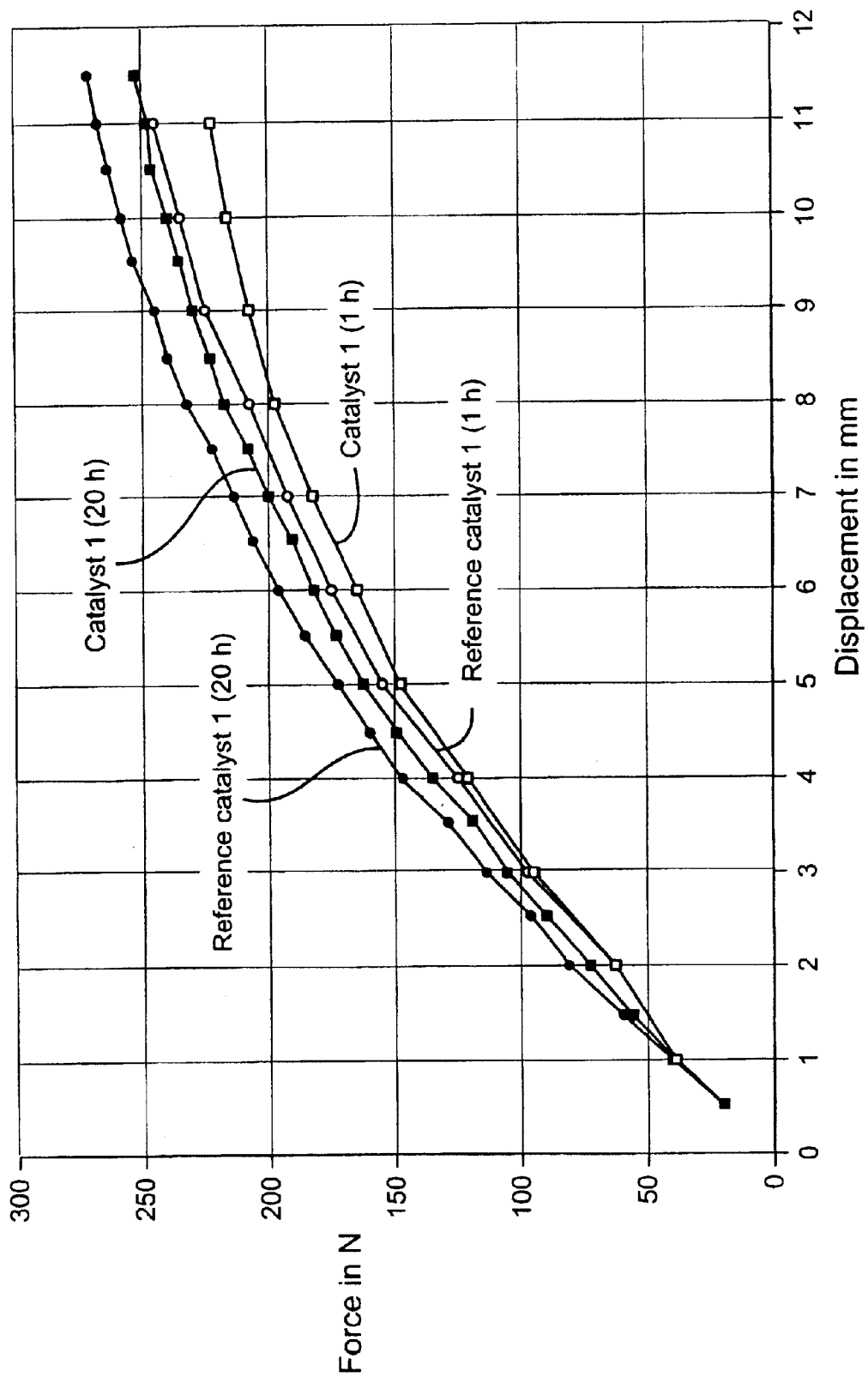

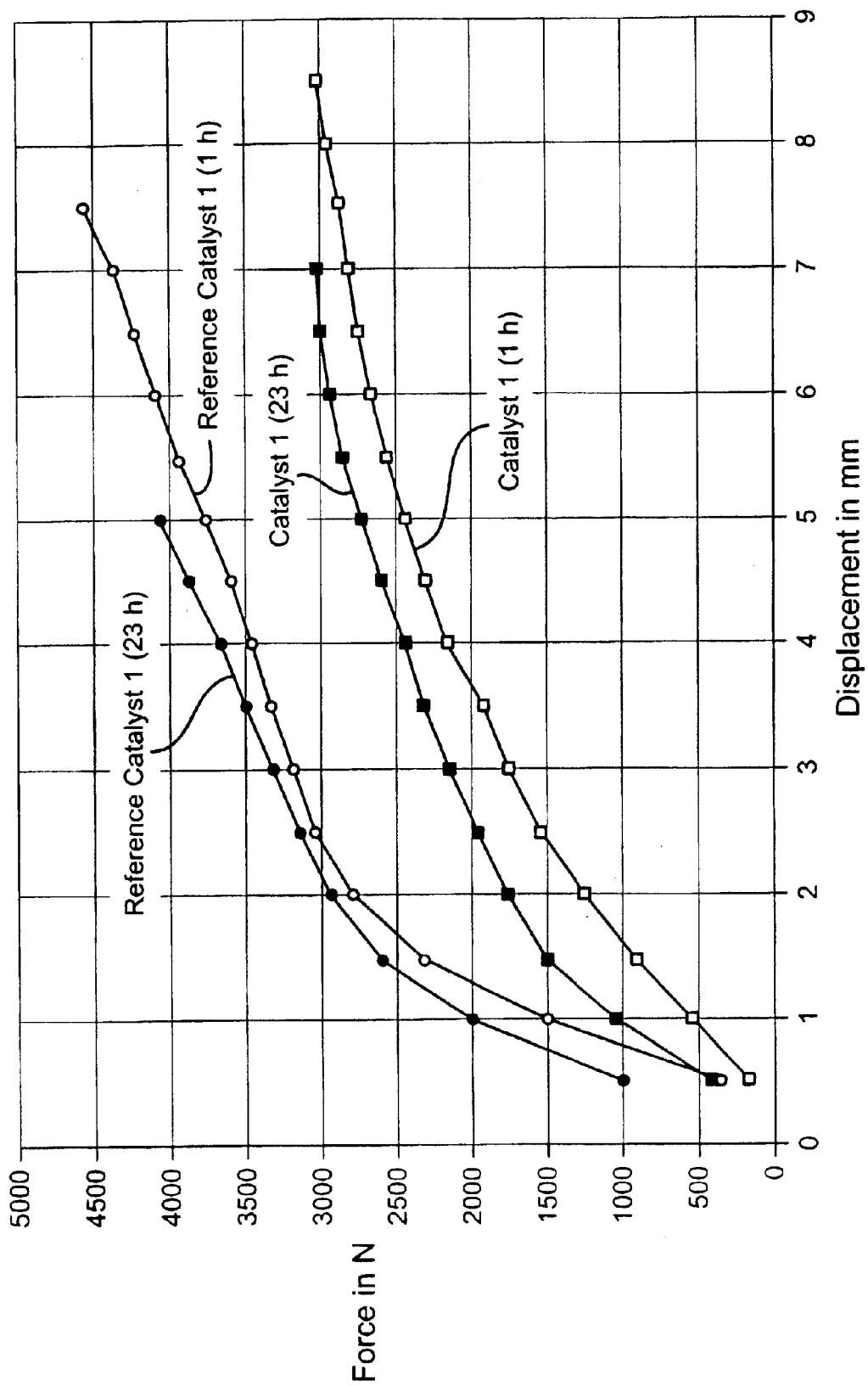
Fig. 2  Compression Test

COMPOSITIONS FOR THE MANUFACTURE OF ORGANO-MINERAL PRODUCTS, PRODUCTS OBTAINED THEREFROM AND THEIR USE

The present invention relates to compositions for the manufacture of organo-mineral products, products obtained therefrom and their use.

Methods for the manufacture of porous (foamed) and non-porous organo-mineral products by the conversion of polyisocyanates and aqueous alkali silicate solutions (water glasses) are known, for example, from DE-A-177 03 84, DE-A-246 08 34 and EP-B-0 000 579. In these instances, alkali water-glasses with a different solid-substance content and different ratio of $Me_2O/SiO_2$ (Me: alkali metal) are preferably used.

Organo-mineral products characterized by a high mechanical strength are described in EP-B-0 167 002. Polyisocyanate in an aqueous alkaline solution containing $SiO_2$ is induced into trimerization by the addition of a defined quantity of a polyisocyanate trimerization catalyst.

Initially, the NCO/water-glass reaction is largely suppressed, so that a quantity of gaseous $CO_2$, controllable by the formulation, is produced, which is optimally used for the reaction with the water glass. During the reaction, two interwoven polymer structures are simultaneously formed, so that there is a dense high-strength network in the organo-mineral product produced.

In the first stage of the reaction, a proportion of the polyisocyanate reacts with the water to form polycarbamide, with the separation of gaseous $CO_2$. The $CO_2$ produced in situ reacts instantaneously with the $Me_2O$ component of the water-glass solution to form $Me_2CO_3 \times H_2O$. By the bonding of the $Me_2O$ from the water-glass solution, the $SiO_2$ component is induced to form polysilicic acid. Considerable quantities of heat are released in the reaction, so that, in the next stage, a particular further proportion of the polyisocyanate can take part in the trimerization reaction. Initially trimerized products for their part at least partly undergo further trimerization, so that a branched high-molecular structure can be formed.

A similar concept is applied in mining and tunnelling to stabilize coal and rock, as well as in the construction industry in general to stabilize and consolidate stone and brickwork, as in the preservation of old structures, for example, and is described in EP-B-0 167 003.

For application purposes, it is in most cases desirable in practice to process two-component systems, consisting of a water-glass component (component A) and an isocyanate component (component B), wherein the catalyst can be added either to component A or component B. On the one hand, the catalyst should be chemically compatible with the component concerned, and on the other there should be an even dispersion of the catalyst in the component.

In the isocyanate component, the stable dispersion/solution of a catalyst presents no problem, provided moisture is strictly excluded whilst working. Heterocyclically substituted ethers which can be stably dispersed in the isocyanate component are described in EP-B-0 636 154. In practice, however, this is only possible in closed systems, such as in spray cans or with cartridge methods.

The catalyst is therefore generally added to the water-glass component. Whereas, in the isocyanate component, stable dispersion of the catalyst presents no problem, provided the exclusion of moisture is ensured, in the water-glass component, on the other hand, it is impossible to prevent floating or hydrolysis of the catalyst in the highly alkaline solution, so that the catalyst can be added only shortly before the components are mixed, or must be carefully redispersed in the water-glass component shortly before being brought together with the other components.

It has been observed that the tendency towards dehomegenization can be reduced if antimony trioxide is added to the mixture (EP-B-0 167 002+003). Even this, of course, does not produce a dispersion which can be stored for months. Using the dispersing agents, solubilizers, stabilizers, emulsifiers, wetting agents, surfactants or polyols has not yielded a completely satisfactory result, either.

Catalysts used in the past have been amine catalysts common in polyurethane chemistry, such as tertiary amines, tertiary amino-alcohols or polyamines. Besides these, the trimerization catalysts known from EP-B-0 167 002 and EP-B-0 167 003 are also used: these are similarly tertiary amine catalysts or Mannich bases. Metallo-organic compounds, such as dibutyl tin laurate, are described in EP-B-0 016 262. With the tertiary amines and Mannich bases customarily used as catalysts in the past, even when polymers have been used on the isocyanate side, mechanically strong, but relatively brittle, hard products have in fact been obtained, in which the properties of the product are difficult to control.

The invention is consequently based on the problem of producing new organo-mineral products which exhibit the desired properties, are cheap and can be manufactured in a simplified manner.

This problem has been solved by the surprising discovery that primary amino-alcohols can be stably dissolved as catalysts in the water-glass components, at the same time resulting in organo-mineral products with the desired properties. This is surprising, insofar as primary amino-alcohols are hardly used in polyurethane chemistry, since undesirable effects, such as "swelling" of the reaction mixture, often occur as a result of the extremely high reaction rate. The controllability of the desired product-properties also decreases as the reaction rate increases. It is all the more surprising, because the use of primary amino-alcohols not only solves the long-standing problem of the stable dispersibility of the catalyst in the water-glass component, but also opens up the way to organo-mineral products with specific properties/characteristics. With the tertiary amines and Mannich bases which have customarily been used as catalysts in the past, even when polymers have been used on the isocyanate side, mechanically strong, but relatively brittle, hard products have in fact been obtained. With the existing invention, it has now become possible to produce organo-mineral products which are not only characterized by a high mechanical strength, but in addition also by outstanding elastic properties, whereby a high mechanical load carrying capacity is obtained.

The subject of the present invention is consequently a compositions comprising a component (A) containing an aqueous alkali silicate solution and a primary alcohol as a catalyst, and a component (B) containing a polyisocyanate.

The subject of the present invention is further an organo-mineral product, essentially from the conversion of polyisocyanates and aqueous alkali silicate solutions, in the presence of a primary amino-alcohol as a catalyst.

The subject of the present invention is also the use of an organo-mineral product as a building material, coating material, sealant or insulating material, or as a cement or adhesive.

The essential constituents of the reaction mixture for the manufacture of organo-mineral products are an aqueous water-glass solution, a polyisocyanate and a primary amino-alcohol as catalyst.

The catalysts according to the invention preferably exhibit the following general formula:

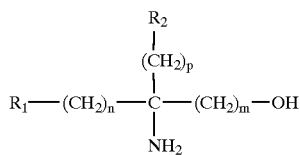

in which $R_1$ and $R_2$, independently of each other, represent a hydrogen atom, a hydroxyl or methyl group, and m, n and p, independently of each other, have the value zero or a whole number from 1 to 20, preferably 1 to 10, and especially 1 to 4, with the condition that they cannot all be zero.

Catalysts in which n=1, 2 or 3, m=1 and p≧0 are preferable used.

The aforementioned catalysts can be used individually or as a mixture.

In the composition of the water-glass solution which is customary and is preferably used according to the invention, the molar ratio of catalyst to NCO groups is 2 to 150, and preferably 8 to 40 mmol catalyst per mole of NCO. The molar ratio of the catalyst to $SiO_2$ is preferably 5 to 100 mmol catalyst per mole of $SiO_2$. The molar ratio of catalyst to $Me_2O$ is preferably 5 to 100 mmol catalyst per mole of $Me_2O$.

Organo-mineral products with particularly favourable properties are obtained, for example, when polyisocyanate and water glass are used in such a quantity and composition that the above-mentioned ratio of quantity of catalyst to NCO groups is obtained, together with the similarly mentioned suitable ratio of $NCO/SiO_2$. The quantity of $CO_2$ generated should be absorbed by the proportion of $Me_2O$ as completely as possible.

The catalyst is preferably used in an absolute quantity of 0.1 to 5.0 g, related to 100 g of water-glass component A.

Furthermore, a co-catalyst can be added to the reaction mixture or to the individual components A and/or B. This can consist, for example, of a trivalent iron compound, such as $FeCl_3$. Other inherently known co-catalysts can also be used, e.g. tri-alkylphosphanes, such as trimethylphospholine, alkali metal salts or carbonic acids, such as sodium acetate or sodium maleate, or transitional metal compounds, such as $Sb_2O_3$, $ZrOCl_2$, $SbCl_5$ or CuCl. Mannich bases in particular, such as 2,4,6-tris(dimethylaminomethyl)phenol, are suitable for use in the water-glass component. Morpholine ethers, such as dimorpholinodiethylether, in particular, are suitable for use in isocyanate components.

Components A and B are preferably mixed in a volumetric ratio of 3/1 to 1/3, especially 2/1 to 1/1.

The primary amino-alcohol catalysts according to the invention can be stably dispersed in the water-glass component. The non-separating-out of component A permits unrestricted usability and storability of the compound. Storage tests have shown that both component A and component B can still be processed after several months, without loss of quality. Time-consuming redispersal of the catalyst can consequently be dispensed with.

In previously known systems employing trimerization catalysts, transformation of the mixture begins with reaction of NCO groups with the water of the water-glass solution. Gaseous $CO_2$ and polycarbamide are produced. This transformation takes place exothermally, and the heat liberated causes the start of trimerization of the remaining NCO groups under the action of the catalyst. The liberated $CO_2$ for its part is transformed with the $Me_2O$ of the water glass into alkali metal carbonate. The $Me_2O$ component is taken from the water-glass, and, in the course of transformation, the remaining silicic acid component forms a three-dimensional inorganic structure, which combines with the organic polymerisate simultaneously produced to form a interwoven network of great strength.

Without specifying a particular theory, it is assumed that, in contrast to the above reaction-mechanism, in the transformation of the composition according to the invention the primary amino-function, as well as the terminal OH function (s) of the catalyst, enters into a reaction with the isocyanate component. Whether trimerization also takes place is unclear. The isocyanate component may also be present as a polymer. Depending on the functionality of the catalyst used, an even higher-molecular weight prepolymer is thereby formed, which encloses the polysilicic acid structure produced and reinforces the elastic properties of the finished product. The degree of cross-linking in the prepolymer, and consequently in the finished product, can be determined by the functionality of the amino alcohol used. Organo-mineral products can thereby be obtained, in which the elastic properties/characteristics can be tailor-made.

In the compositions in the present invention, the aqueous alkali silicate solutions customarily used in this field can be used in component A, for example the water-glass solution described in EP-B-0 000 579 and in DE-A-2 460 834. By virtue of their easy availability and low viscosity, sodium water-glasses are preferred.

Sodium water-glasses, with a relatively high solids-content, favourably in the range from around 30 to 60 percent by weight, and especially roughly 40 to 55 percent by weight of inorganic solids, are preferably used. In theory, even higher-concentration water-glass solutions can be used and be employed within the meaning of the invention. Because of the resultant processing speeds, such water-glass solutions have little practical significance.

The molar ratio of $SiO_2$ to $Me_2O$ in the water-glass solution used is preferably comparatively high and is favourably in the range from around 2.09 to 3.44. A range from around 2.48 to 3.17, and especially 2.40 to 2.95, is particularly preferred. Formation of the three-dimensional silicic acid structure is favoured by an $Me_2O$ content within the range indicated above.

The polyisocyanates customarily used in this field can be used as component B in the compositions in the present invention, for example the compounds referred to in EP-B-0 000 579 and in DE-A-2 460 834. Also suitable are NCO pre-adducts, as known in the manufacture of polyurethanes and as described in DE-A-2 460 834.

Polyisocyanates which are easily able to assume a three-dimensional structure are preferred in the compositions in the present invention. These are compounds which, as far as possible, exhibit no steric hindrance to the NCO groups involved in the transformation. One special example of such a sterically unhindered polyisocyanate is 4,4'-diphenylmethanediisocyanate, which can also exist in the form of the phosphogenation product of aniline formaldehyde condensates (crude MDI). A reaction product of crude MDI with a diol, with an OH number of 28 to 1800, especially with an OH number from 40 to 100, and preferably with an OH number from 50 to 60, is suitable as a prepolymerisate. Ethylene glycol and, by virtue of its low reactivity, especially diols based on propylene glycol, for example, are suitable as diols.

The polyisocyanates used according to the invention preferably have an NCO-group content of roughly 10 to 55% by wt., referred to the mass of the polyisocyanate. Polyisocyanates with an NCO-group content of roughly 10 to 30% by wt. are particularly preferred. A smaller proportion of NCO groups in the polyisocyanate makes the formation of a three-dimensional organic structure difficult. On the other hand, with a higher NCO content, it is easy for too much gaseous $CO_2$ to be liberated, which can result in overhardening of the inorganic part of the product and favours uncontrolled foaming.

Nucleating and stabilizing substances can also be added to the compositions in the invention. Suitable nucleating substances include, for example, finely divided solid substances, such as silicon dioxide or aluminium oxide, possibly together with zinc stearate, amorphous silicic acid or metasilicate. Of these, the silicon dioxide precipitated from the colloidal water-glass solution is preferred as a nucleating agent.

Silicons with a basis of polysiloxanes are suitable stabilizers. These can be added in a quantity of roughly 0.2 to 2, and especially 0.8 to 1.4 percent by weight, referred to the total mass of the reaction mixture.

Depending on the desired properties/characteristics of the organo-mineral products being manufactured, still further additives can be added to the compositions in the invention. These include, for example, organic compounds exhibiting residues capable of reacting in relation to isocyanate groups. Examples of these include polyols, such as polyester and polyether polyols and phosphonate esters known in polyurethane chemistry. The quantity of the polyols should be limited, so that their addition does not disturb the formation of a three-dimensional organic structure and of an inorganic structure interwoven with it. The addition of polyol or phosphonate ester is therefore expediently limited to a maximum of 2 to 45% by wt., preferably 10 to 20% by weight, referred to the isocyanate component.

In order to reduce the flammability of the organo-mineral products in the invention, flame-inhibiting substances can be added to the compounds or individual components. The flame-inhibiting or flame-retardant substances known in plastics chemistry, such as phosphates and borates, are suitable for the purpose. The quantity of flame-inhibiting substances can be in the range from 2 to 30% by wt., referred to the isocyanate component. Phosphonate esters, such as tri-$\beta$-chlorethyl phosphonate or tri-$\beta$-isopropyl phosphonate, for example, can be added as a flame protection agent and to reduce viscosity. Furthermore, liquid organic carbonates, phthalates or halogenated alkyl phosphates are suitable as stabilizers, emulsifiers or as viscosity reducing agents.

Furthermore, additives and fillers can be added to the compositions in the invention, to bring about further reinforcement of the organo-mineral products. Examples of suitable fillers include diatomaceous earth, aluminium oxide hydrate, magnesium silicate, asbestos powder, chalk, asbestos fibres and glass fibres. The quantity of filler added is governed primarily by the viscosity of the mixture. It is preferably in the range from 0.1 to 30% by wt., referred to the weight of the water-glass solution used.

If desired, pigments or dyes can be added to the components.

In order to reduce viscosity, an aqueous alkali hydroxide solution can be added to component A. An NaOH solution is suitable as the alkali hydroxide solution, for example, preferably in the form of a 30–50% solution, and especially as a 45% solution. Component A can further contain the flame-inhibiting additives, fillers and dyes. Component B, the polyisocyanate, possibly contains the co-catalyst, as well as the stabilizer and, where applicable, the additives and fillers compatible with the above-mentioned constituents.

To produce the organo-mineral products in the invention, components A and B are carefully mixed. The starting time of the mixtures obtained is generally between 5 seconds and 5 minutes, and can be controlled as required. Where appropriate, the components or mixture can be heated or cooled, in order to adapt the starting time to requirements.

In their curing behaviour, the compositions in the present invention are similar to polyurethanes. They offer a well-balanced curing performance as previously-known organo-mineral products and are also characterized by an increased early strength. Catalysts in the past have brought about continuous and spontaneous curing. The longer curing phase of the organo-mineral products in the invention permits more flexible processing, compared with the known products.

The compositions in the present invention are characterized by storability and the associated unrestricted usability. In particular, a stable dispersion of the catalyst in the water-glass component is ensured in the compositions according to the invention. The floating of the catalyst previously observed no longer occurs, so that it is possible to dispense with time-consuming redispersal of the catalyst prior to processing. The compositions in the invention thereby enjoy a constant quality of processing and can be stored without limitation.

In addition, the degree of cross-linking in the finished product can be controlled through the choice of catalyst functionality. Organo-mineral products can thereby be produced with tailor-made properties/characteristics in the finished product. In particular, the present products are characterized by high elasticity, combined with a high mechanical load-carrying capacity.

The organo-mineral products in the present invention are consequently versatile in use. The compounds produced can be applied, for example, by dipping, spraying, using a palette-knife, by injection, with a roller or by painting. They are therefore suitable for a wide range of applications, e.g. as building materials, coating materials, sealants and insulating materials, as well as cement or adhesive. In addition, they offer the advantages of cost-effective raw materials, exhibit a low flammability and have an anti-corrosive action. In addition, an increased solvent-resistance and low swelling-effect are provide by silicic acid component. The organo-mineral products of the invention are thus characterized by resistance to all common solvents, such as mineral oils or benzene, but also to lyes and acids.

The invention is further explained by the following non-limiting examples.

I. Manufacture of Organo-Mineral Products

The A component is obtained by the intimate mixing of water-glass, catalyst, water and, where applicable, lye. The B component is produced separately. To do so, the isocyanate is mixed with the additives indicated and possibly with a polyol. If a polyol is added, the mixture is given time for the reaction for the prepolymer (12 to 24 hours).

In a manual trial, A and B components are mixed with a stirrer (diam. 65 mm) at a rotational speed of 2500 rpm at roughly 20–20° C. for roughly 15 seconds. The components are inserted in the quantities indicated in table 1. The curing times are determined. The values obtained are listed in Table 1.

TABLE 1

Example 1 to 14; reference example A

| Example | Component A (g) | Component B (g) | Curing time (min) |
|---|---|---|---|
| 1 | 97.5 Na-WG 48/50<br>2.0 NaOH (45%)<br>1.5 Catalyst 1 | 40 Isocyanate 1<br>40 Isocyanate 2 | 300 |
| 2 | 97.5 Na-WG 48/50<br>2.0 NaOH (45%)<br>1.5 Catalyst 2 | 40 Isocyanate 1<br>40 Isocyanate 2 | 300 |
| 3 | 97.5 Na-WG 48/50<br>2.0 NaOH (45%)<br>1.5 Catalyst 1 | 30 Isocyanate 1<br>30 Isocyanate 2<br>13 Diol 1<br>2 Stabiliser<br>8 Propylene carbonate | 6 |
| 4 | 97.5 Na-WG 48/50<br>2.0 NaOH (45%)<br>1.5 Catalyst 2 | 30 Isocyanate 1<br>30 Isocyanate 2<br>13 Diol 1<br>2 Stabiliser<br>8 Propylene carbonate | 8 |
| 5 | 97.5 Na-WG 48/50<br>2.0 NaOH (45%)<br>1.5 Catalyst 3 | 30 Isocyanate 1<br>30 Isocyanate 2<br>13 Diol 1<br>2 Stabiliser<br>8 Propylene carbonate | 5 |
| 6 | 97.5 Na-WG 48/50<br>2.0 NaOH (45%)<br>1.5 Catalyst 4 | 30 Isocyanate 1<br>30 Isocyanate 2<br>13 Diol 1<br>2 Stabiliser<br>8 Propylene carbonate | 9 |
| 7 | 97.5 Na-WG 48/50<br>2.0 NaOH (45%)<br>1.5 Catalyst 5 | 30 Isocyanate 1<br>30 Isocyanate 2<br>13 Diol 1<br>2 Stabiliser<br>8 Propylene carbonate | 9 |
| 8 | 97.5 Na-WG 48/50<br>2.0 NaOH (45%)<br>1.5 Catalyst 1 | 28 Isocyanate 1<br>28 Isocyanate 2<br>13 Diol 1<br>2 Stabiliser<br>8 Propylene carbonate | 6 |
| 9 | 220 Na-WG 28/30<br>2.0 NaOH (45%)<br>1.5 Catalyst 1 | 28 Isocyanate 1<br>28 Isocyanate 2<br>13 Diol 1<br>2 Stabiliser<br>8 Propylene carbonate | 6 |
| 10 | 97.5 Na-WG 48/50<br>2.0 NaOH (45%)<br>1.5 Catalyst 1 | 56 Isocyanate 1<br>12 Isocyanate 2<br>7 TCPP<br>2 Stabiliser | 200 |
| 11 | 97.5 Na-WG 58/60<br>2.0 NaOH (45%)<br>1.5 Catalyst 1 | 28 Isocyanate 1<br>28 Isocyanate 2<br>13 Diol 1<br>2 Stabiliser<br>8 Propylene carbonate | 1 |
| 12 | 97.5 Na-WG 58/60<br>2.0 NaOH (45%)<br>0.1 Catalyst 1 | 28 Isocyanate 1<br>28 Isocyanate 2<br>13 Diol 1<br>2 Stabiliser<br>8 Propylene carbonate | 10 |
| 13 | 97.5 Na-WG 58/60<br>2.0 NaOH (45%)<br>5.0 Catalyst 1 | 28 Isocyanate 1<br>28 Isocyanate 2<br>13 Diol 1<br>2 Stabiliser<br>8 Propylene carbonate | 0.5 |
| 14 | 97.5 Na-WG 58/60<br>2.0 NaOH (45%)<br>0.5 Catalyst 1 | 28 Isocyanate 1<br>28 Isocyanate 2<br>13 Diol 1<br>2 Stabiliser<br>8 Propylene carbonate | 6 |
| A | 97.5 Na-WG 58/60<br>2.0 NaOH (45%)<br>1.34 Reference Catalyst | 28 Isocyanate 1<br>28 Isocyanate 2<br>13 Diol 1<br>2 Stabiliser<br>8 Propylene carbonate | 1 |

Catalyst 1: 2-amino-2-methyl-1-propanol (used in the form of a 90% solution in water). Catalyst 2: 2-amino-1-butanol (used in the form of a 95% solution in water). Catalyst 3: 2-amino-2-methyl-1,3-propandiol. Catalyst 4: 2-amino-2-ethyl-1,3-propandiol (used in the form of a 85% solution in water). Catalyst 5: tris(hydroxymethyl) aminomethane. Reference catalyst 1: 2,4,6-tris (dimethylaminomethyl)phenol. Diol 1: polypropylene glycol with a hydroxyl number of 56 in mg KOH per g substance. Na-WG: sodium water-glass (58/60: density reading according to Baume). K-WG: potassium water-glass. Isocyanate 1: a polyisocyanate with an NCO-group content of approx. 32% obtained by phosphogenization of a formaldehyde aniline condensate. Isocyanate 2: crude MDI with an NCO-group content of roughly 28%, prepolymerized with a small quantity of a diol. Stabilizer: a commercially-available polyetherpolysiloxane-block-copolymer stabilizer (Tegostab 8863 from the firm of Goldschmidt, Essen). Propylene carbonate, TCPP: trichlorpropylphosphate.

II. Physical Evaluation of Compositions and Products

Storability a) Laboratory experiment: A prepared A-component (Examples 8 to 14) was mixed with the same B-component at monthly intervals, without intermediate stirring, and the reactive times up to curing/hardening were determined, as well as the strength of the products produced. Even after ten months, no changes were observed in the curing behaviour or strength. In contrast, in Reference Example A, floating of the catalyst in the A component was observed after only two days. Mixing inhomogeneities resulted in a deterioration of strength.

b) Machine tests: In order to demonstrate that no separating out of component A occurs while stored, even on a large scale, roughly 200 kg of component A were produced in accordance with Example 14 and were stored in a vessel, without intermediate stirring. Two days after preparation of component A, on which no changes, e.g. floating of the catalyst, were visually apparent, and subsequently at one monthly intervals, a proportion of component A was extracted via the suction hose of a gear pump, was mixed with component B in accordance with Example 14 in a Kennics static-mixer (diam. 16 mm) in a volumetric ratio of 1/1, and transferred via a steel lance (external diameter 30 mm; internal aperture 11 mm) into a cylindrical sheet-metal canister (diam. 31 cm; height 38 cm), filled with the same quantity and type of gravel, until the lance was embedded in the compound to a depth of 15 to 20 cm. The volumetric flow was approx. 30 litre/min.

After consolidation of the gravel (after two days), an attempt was made to withdraw the lance. This required a force of 8 to 9 kN per cm embedded depth. With an embedded depth in excess of 30 cm, it was no longer possible to pull the lance out of the consolidated gravel without breaking it.

Even after several months, the "pull" test yielded the same results two days after filling. This indicates that no changes occur in the material properties/characteristics, and also that the catalyst is stably dispersed in the A component for months, even in large quantities.

It was not possible to conduct the experiment using components from Reference Example A, since floating of the catalyst occurred after only two days.

Bending Strength

In order to determine the bending strength of products from Example 14 and Reference Example A, test pieces with a length of 150 mm, a width of 20 mm and a height of 10 mm were prepared. The test pieces were subjected to force/displacement bending tests. The distance from the bearing was 100 mm. The measurements were performed with equivalent quantities of catalyst, 1 h and 20 h after the components had been mixed.

The flow time of the specimens prepared in accordance with Example 14 and Reverence Example A was approx. 2 min.

The measurements were made with a compression/tension testing machine made by the firm Form & Test. The curves were drawn with an XY recorder made by Linseis. The measured values are listed in Table 2 and presented in FIG. 1.

TABLE 2

| Displacement (mm) | Force (Newton) | | | |
|---|---|---|---|---|
| | Reference catalyst 1 (20 h) | Catalyst 1 (20 h) | Reference catalyst 1 (1 h) | Catalyst 1 (1 h) |
| 0.5 | 20 | 20 | | |
| 1.0 | 40 | 37.5 | 37.5 | 37.5 |
| 1.5 | 60 | 57.5 | | |
| 2.0 | 80 | 72.5 | 62.5 | 62.5 |
| 2.5 | 95 | 90 | | |
| 3.0 | 112.5 | 105 | 97.5 | 95 |
| 3.5 | 127.5 | 117.5 | | |
| 4.0 | 147.5 | 135 | 125 | 120 |
| 4.5 | 160 | 150 | | |
| 5.0 | 172.5 | 162.5 | 155 | 147.5 |
| 5.5 | 185 | 172.5 | | |
| 6.0 | 195 | 182.5 | 175 | 165 |
| 6.5 | 205 | 190 | | |
| 7.0 | 212.5 | 200 | 192.5 | 182.5 |
| 7.5 | 222.5 | 207.5 | | |
| 8.0 | 232.5 | 217 | 207.5 | 197.5 |
| 8.5 | 240 | 222.5 | | |
| 9.0 | 245 | 230 | 225 | 207.5 |
| 9.5 | 252.5 | 235 | | |
| 10.0 | 257.5 | 240 | 235 | 215 |
| 10.5 | 262.5 | 245 | | |
| 11.0 | 267.5 | 247.5 | 245 | 222.5 |
| 11.5 | 270 | 252.5 | | |

FIG. 1 shows that using the catalyst according to the invention (Catalyst 1), compared with conventionally used tertiary amino-phenol catalysts such as Reference Catalyst 1, results in more-elastic products (greater deflection with same force).

Compressive Strength

In order to determine the compressive strength of the products from Example 14 and Reference Example A, test pieces with a diameter of 16.6 mm and a height of 30 mm were prepared. The test pieces were subjected to compression and the deflection was determined. The measurements were performed with equivalent quantities of catalyst, 1 h and 23 h after the components had been mixed.

The measurements were performed with a compression/tension testing machine made by the firm Form & Test. The curves were drawn with an XY recorder from the firm Linseis. The measured values are listed in Table 3 and presented in FIG. 2.

TABLE 3

| Displacement (mm) | Force (N) | | | |
|---|---|---|---|---|
| | Reference catalyst 1 (23 h) | Catalyst 1 (23 h) | Reference catalyst 1 (1 h) | Catalyst 1 (1 h) |
| 0.5 | 1000 | 425 | 350 | 175 |
| 1.0 | 2000 | 1050 | 1500 | 525 |
| 1.5 | 2600 | 1500 | 2350 | 900 |
| 2.0 | 2950 | 1775 | 2800 | 1250 |
| 2.5 | 3150 | 1975 | 3050 | 1550 |
| 3.0 | 3325 | 2150 | 3200 | 1750 |
| 3.5 | 3500 | 2325 | 3350 | 1925 |
| 4.0 | 3675 | 2450 | 3475 | 2175 |
| 4.5 | 3875 | 2600 | 3625 | 2325 |
| 5.0 | 4075 | 2725 | 3775 | 2450 |
| 5.5 | | 2850 | 3950 | 2575 |
| 6.0 | | 2950 | 4100 | 2675 |
| 6.5 | | 3000 | 4250 | 2750 |
| 7.0 | | 3025 | 4375 | 2825 |
| 7.5 | | | 4575 | 2875 |
| 8.0 | | | | 2970 |
| 8.5 | | | | 3025 |

FIG. 2 shows that using the catalyst according to the invention (Catalyst 1), compared with conventionally used tertiary amino-phenol catalysts, such as Reference Catalyst 1, results in more-elastic products (greater compression with same force).

What is claimed is:

1. Compositions, comprising a component (A) containing an aqueous alkali silicate solution and a primary amino-alcohol as a catalyst, and a component (B) containing a polyisocyanate.

2. Composition according to claim 1, wherein the catalyst is stably dispersed in component (A).

3. Composition according to claim 1, wherein components (A) and (B) are separate.

4. Composition according to claim 1, wherein the catalyst has the general formula (I):

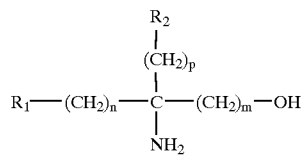

in which $R_1$ and $R_2$, independently of each other, represent a hydrogen atom, a hydroxyl or methyl group, and m, n and p, independently of each other, have the value zero or a whole number from 1 to 20, with the condition that they cannot all be zero.

5. Composition according to claim 4, wherein n=1, 2 or 3, m=1 and p≧0.

6. Composition according to claim 1, wherein the polyisocyanate exhibits an NCO-group content of 10 to 55 per cent by weight, referred to the mass of the polyisocyanate.

7. Composition according to claim 6, wherein the polyisocyanate exhibits an NCO-group content of 10 to 30 per cent by weight, referred to the mass of the polyisocyanate.

8. Composition according to claim 6, wherein the polyisocyanate is 4,4'-dimethylmethanediisocyanate, a phosphogenation product of aniline formaldehyde condensates (crude MDI) or a prepolymer thereof.

9. Composition according to claim 8, wherein the prepolymer is a reaction product of crude MDI and a diol with an OH number of 28 to 1800.

10. Composition according to claim 1, wherein the alkali silicate is a sodium silicate with a solids content of 30 to 60% by wt.

11. Composition according to claim 1, wherein the aqueous alkali silicate solution has a molar ratio of $SiO_2$ to $Me_2O$ of 2.09 to 3.44, preferably from 2.4 to 3.17.

12. Organo-mineral product obtainable by the transformation of polyisocyanates and aqueous alkali silicate solutions in the presence of a primary amino-alcohol as a catalyst.

13. Use of a composition according to claim 1, as a building, coating, sealing or insulating material, or as a cement or adhesive comprising applying the composition of claim 1 to a substrate.

14. Use of a composition of an organo-mineral product as defined in claim 12 as a building, coating, sealing or insulating material, or as a cement or adhesive comprising applying the organo-mineral product of claim 12 to a substrate.

* * * * *